United States Patent
Xiang et al.

(10) Patent No.: US 9,569,026 B2
(45) Date of Patent: Feb. 14, 2017

(54) METHOD FOR REPORTING COORDINATE POINT OF TOUCH SCREEN AND MOBILE TERMINAL

(71) Applicant: ZTE CORPORATION, Shenzhen, Guangdong Province (CN)

(72) Inventors: Gonghong Xiang, Shenzhen (CN); Shufang Dong, Shenzhen (CN); Cong Chen, Shenzhen (CN); Fangming Fang, Shenzhen (CN)

(73) Assignee: ZTE Corporation (CN)

(*) Notice: Subject to any disclaimer, the term of this patent is extended or adjusted under 35 U.S.C. 154(b) by 72 days.

(21) Appl. No.: 14/409,901

(22) PCT Filed: May 24, 2013

(86) PCT No.: PCT/CN2013/076190
§ 371 (c)(1),
(2) Date: Dec. 19, 2014

(87) PCT Pub. No.: WO2013/189227
PCT Pub. Date: Dec. 27, 2013

(65) Prior Publication Data
US 2015/0138108 A1 May 21, 2015

(30) Foreign Application Priority Data
Jun. 20, 2012 (CN) .......................... 2012 1 0204613

(51) Int. Cl.
*G06F 3/041* (2006.01)
*G06F 3/0488* (2013.01)

(52) U.S. Cl.
CPC ........... *G06F 3/0412* (2013.01); *G06F 3/0418* (2013.01); *G06F 3/0488* (2013.01); *G06F 2203/04104* (2013.01); *G06F 2203/04808* (2013.01)

(58) Field of Classification Search
USPC ......................................................... 345/173
See application file for complete search history.

(56) References Cited

U.S. PATENT DOCUMENTS 6,809,726 B2   10/2004   Kavanagh
8,692,795 B1 *  4/2014   Kremin .................. G06F 3/044
                                                345/173

(Continued)

FOREIGN PATENT DOCUMENTS

CN     101706699 A      5/2010
CN     101882041 A     11/2010

(Continued)

OTHER PUBLICATIONS

European Search Report dated May 11, 2015 of European patent Application No. 13806425.8.

*Primary Examiner* — Jason Olson
(74) *Attorney, Agent, or Firm* — Plumsea Law Group, LLC

(57) ABSTRACT

A method and a mobile terminal for reporting a coordinate point of the touch screen. The method includes: the mobile terminal receiving a touch event of the touch screen; when two touch events are received simultaneously with the coordinate points of one touch event which is called as a first touch event including coordinate points belonging to a border region of the touch screen and all of the coordinate points of the other touch event which is called as a second touch event belonging to a non-border region of the touch screen, the mobile terminal determining a central coordinate point of the first touch event, correcting the central coordinate point to the border side of the touch screen nearest to the central coordinate point according to the second touch event; and taking the corrected coordinate point as a reported coordinate point.

10 Claims, 3 Drawing Sheets

(56) References Cited

U.S. PATENT DOCUMENTS

2002/0070926 A1    6/2002   Kavanagh
2010/0053111 A1*   3/2010   Karlsson ............. G06F 3/04883
                                                  345/174
2012/0098759 A1    4/2012   Chang

FOREIGN PATENT DOCUMENTS

CN        101882043 A    11/2010
CN        102750034 A    10/2012
WO     2009113754 A1    9/2009

\* cited by examiner

US 9,569,026 B2

METHOD FOR REPORTING COORDINATE POINT OF TOUCH SCREEN AND MOBILE TERMINAL

CROSS-REFERENCE TO RELATED APPLICATION

This application is the U.S. National Phase application of PCT application number PCT/CN2013/076190 having a PCT filing date of May 24, 2013, which claims priority of Chinese patent application 201210204613.8 filed on Jun. 20, 2012, the disclosures of which are hereby incorporated by reference.

TECHNICAL FIELD

The present document relates to a mobile terminal with a touch screen, and particularly, to a method and a mobile terminal for reporting a coordinate point of the touch screen.

BACKGROUND OF THE RELATED ART

At present, most of the touch screens of mobile terminals are capacitive screens, as shown in FIG. 1. A touch perception module (1) is used to send a touch event of the touch screen perceived to a coordinate point generation module (2) after the user clicks the touch screen with the user's finger; a reception unit (21) in the coordinate point generation module (2) sends the touch event to a coordinate point unit (22) after receiving the touch event; as there are a plurality of coordinate points in the touch event and each coordinate point corresponds to a rather large area on the screen, the coordinate point generation unit (22) takes a coordinate point in a central location (i.e. a central coordinate point) among the coordinates points of the touch event as a reported coordinate point to report according a coordinate point reporting algorithm. When a user performs the touch operation in the central region of the touch screen, the operation is successful. However, when the touch target lies in the border of the touch screen, a problem that the target cannot to be touched may be existed, which causes a phenomenon of reporting points abnormally in a region of the touch screen border arises in the mobile terminal with a touch screen.

To overcome the above problem, the terminal is improved in hardware such as extending the touch screen region, i.e. making the responding region of the touch screen larger than the displaying region of the touch screen. However, this method is required to increase the hardware overhead.

SUMMARY

The embodiment of the present document provides a method and a mobile terminal for reporting a coordinate point of a touch screen in order to solve the problem that the target in the border of the touch screen cannot be touched smoothly.

The embodiments of the present document provide a method for reporting a coordinate point of a touch screen, comprising:

a mobile terminal receiving a touch event of the touch screen; and when two touch events are received simultaneously with coordinate points of one of the two touch events which is called as a first touching event including coordinate points belonging to a border region of the touch screen and all of the coordinate points of the other one of the two touch events which is called as a second touch event belonging to a non-border region of the touch screen, the mobile terminal determining a central coordinate point of the first touch event, correcting the central coordinate point to a border side of the touch screen nearest to the central coordinate point according to the second touch event, and taking the corrected coordinate point as a reported coordinate point.

The method further comprises:

when only one touch event is received and the coordinate points of the touch event do not include coordinate points belonging to the border region of the touch screen, the mobile terminal taking the central coordinate point of the touch event as the reported coordinate point.

The above method may further have the following features:

the step of the mobile terminal correcting the central coordinate point to a border side of the touch screen nearest to the central coordinate point according to the second touch event comprises:

correcting a fixed number of pixels, or correcting a number of pixels determined according to a movement speed of the coordinate point of the second touch event.

The above method may further have the following features:

correcting the central coordinate point is in a direction which is perpendicular to the border side of the touch screen nearest to the central coordinate point, or in a direction which is same with a movement direction of the coordinate point of the second touch event.

The above method may further have the following features:

the border region of the touch screen is a preset region defaulted by a system or a region set by a user.

The embodiments of the present document further provide a mobile terminal for reporting a coordinate point of a touch screen, comprising: a touch perception module and a coordinate point generation module, wherein:

the touch perception module is configured to: send a touch event of the touch screen perceived to the coordinate point generation module;

the coordinate point generation module comprises: a reception unit and a coordinate point generation unit;

the reception unit is configured to: receive the touch event and send the touch event to the coordinate point generation unit;

the coordinate point generation unit is configured to: take a central coordinate point of the touch event as a reported coordinate point;

the coordinate point generation module further comprises: a judgment unit and a corrected coordinate point generation unit;

the reception unit is configured to: send the touch event received to the judgment unit;

the judgment unit is configured to: when two touch events are received simultaneously with coordinate points of one of the two touch events which is called as a first touching event including coordinate points belonging to a border region of the touch screen and all of the coordinate points of the other one of the two touch events which is called as a second touch event belonging to a non-border region of the touch screen, send the first touch event and the second touch event to the corrected coordinate point generation unit;

the corrected coordinate point generation unit is configured to: determine the central coordinate point of the first touch event, correct the central coordinate point to a border side of the touch screen nearest to the central coordinate point according to the second touch event, and take the corrected coordinate point as the reported coordinate point.

The above mobile terminal may further have the following features:

the judgment unit is further configured to: when only one touch event is received and coordinate points of the touch event do not include coordinate points belonging to the border region of the touch screen, send the touch event to the coordinate point generation unit.

The above mobile terminal may further have the following features:

the corrected coordinate point generation unit is configured to: correct a fixed number of pixels, or correct a number of pixels determined according to a movement speed of the coordinate point of the second touch event.

The above mobile terminal may further have the following features:

the corrected coordinate point generation unit is configured to: perform the correction in a direction which is perpendicular to the border side of the touch screen nearest to the central coordinate point, or in a direction which is same with a movement direction of the coordinate point of the second touch event.

The above mobile terminal may further have the following features:

the coordinate point generation module further comprises a touch screen border region setting unit;

the touch screen border region setting unit is configured to: take a preset region defaulted by a system or a region set by a user as the border region of the touch screen to output to the judgment module.

In the present solution, the second touch is added by employing the multi-touch characteristic of the terminal screen. Based on calculating and reporting the coordinate point with the original method, the coordinate points are corrected so that the corrected coordinate points are more nearer to the target in the border region of the touch screen that the user want to touch. According to the present solution, the problem that the target in the border of the touch screen cannot be touched successfully can be solved without increasing the hardware overhead.

PREFERRED EMBODIMENTS OF THE INVENTION

Figure 1:
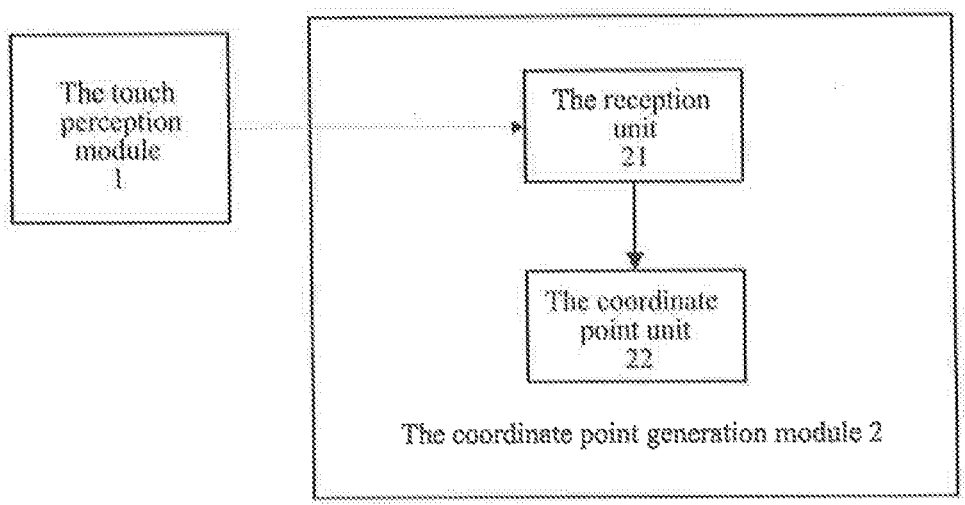
FIG. 1 is a structure diagram of a mobile terminal reporting a coordinate point of a touch screen in related art.
Figure 2:
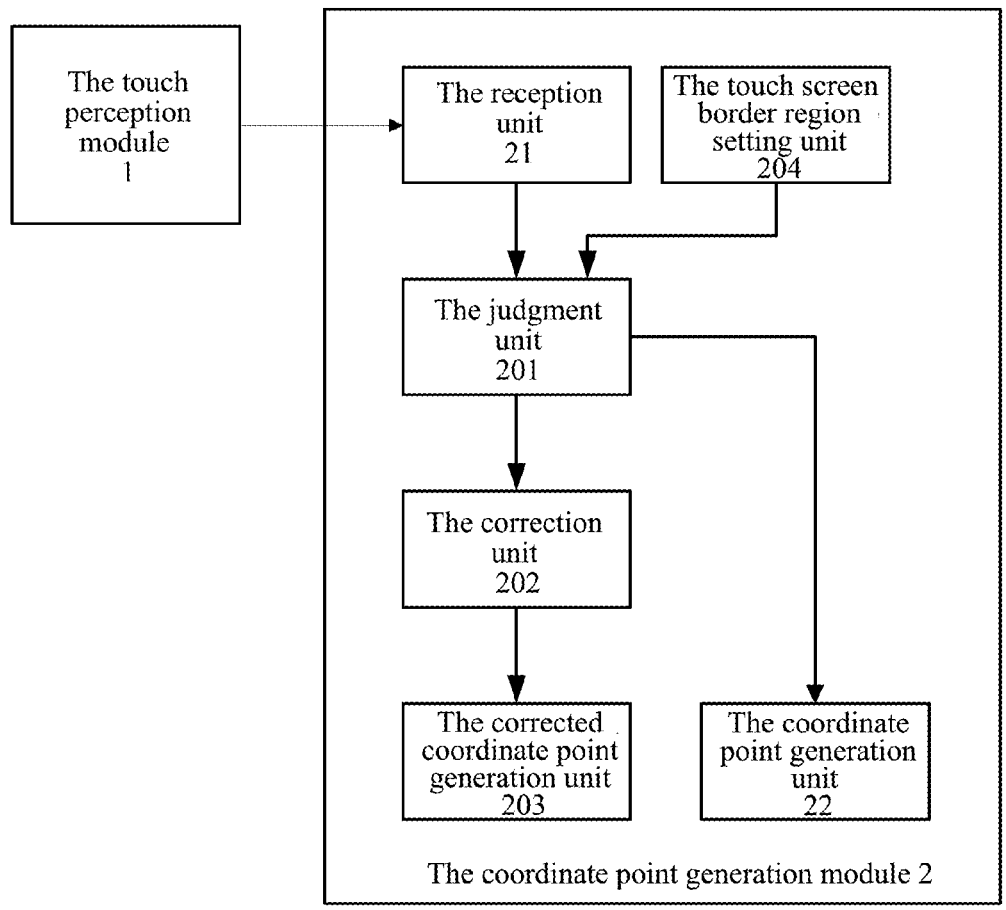
FIG. 2 is a structure diagram of a mobile terminal reporting a coordinate point of a touch screen in the embodiments.

As shown in FIG. 2, the present solution makes improvement based on what is shown in FIG. 1. a judgment unit (201), a correction unit (202), and a corrected coordinate point generation unit (203) are added to a coordinate point generation module (2).

A reception unit (21) is configured to: send a received touch event to the judgment unit (201).

The judgment unit (201) is configured to: when two touch events are received simultaneously with coordinate points of one of the two touch events which is called as a first touching event including coordinate points belonging to a border region of the touch screen and all of the coordinate points of the other one of the two touch events which is called as a second touch event belonging to a non-border region of the touch screen, send the first touch event and the second touch event to the corrected coordinate point generation unit (203).

The corrected coordinate point generation unit (203) is configured to: determine a central coordinate point of the first touch event, correct the central coordinate point to a border side of the touch screen nearest to the central coordinate point according to the second touch event, and take the corrected coordinate point as a reported coordinate point.

The judgment unit (201) is further configured to: when only one touch event is received and coordinate points of the touch event do not include coordinate points belonging to a border region of the touch screen, send the touch event to the coordinate point generation unit (22).

Correcting the central coordinate point includes the following two aspects:

correction direction: the correction direction of the central coordinate point is a direction which is perpendicular to the border side of the touch screen nearest to the central coordinate point, or a direction which is the same with a movement direction of a coordinate point of the second touch event;

correction displacement: it is the number of pixels corrected to the region side of the touch screen nearest to the central coordinate point which is determined according to the movement speed of the coordinate point in the second touch event. When the movement speed of the coordinate point in the second event is fast, the number of the corrected pixels is large; while when the movement speed of the coordinate point in the second event is slow, the number of the corrected pixels is small.

In this method, the border region of the touch screen is defaulted by a system, or is set by the user as required. The coordinate point generation module (2) further includes a touch screen border region setting unit (204). The touch screen border region setting unit (204) takes the preset region defaulted by the system or the region set by the user as the touch screen border region to output to the judgment module (201).

In the above described mobile terminal, a method for reporting a coordinate point of a touch screen includes: a mobile terminal receiving a touch event of the touch screen; when two touch events are received simultaneously with coordinate points of one of the two touch events which is called as a first touching event including coordinate points belonging to a border region of the touch screen and all of the coordinate points of the other one of the two touch events which is called as a second touch event belonging to a non-border region of the touch screen, the mobile terminal determining a central coordinate point of the first touch event, correcting the central coordinate point to a border side of the touch screen nearest to the central coordinate point according to the second touch event, and taking the corrected coordinate point as a reported coordinate point.

For the correction direction, the corrected coordinate point generation unit (203) is configured to: correct the fixed number of pixels, or correct the number of pixels determined according to the movement speed of the coordinate point of the second touch event.

For the correction displacement, the corrected coordinate point generation unit (203) is configured to: perform the correction in a direction which is perpendicular to the border side of the touch screen nearest to the central coordinate point, or in a direction which is the same with a movement direction of the coordinate point of the second touch event.

When only one touch event is received and coordinate points of the touch event do not include coordinate points belonging to a border region of the touch screen, the central coordinate point of the touch event is taken as a reported coordinate point.

The border region of the touch screen is a preset region defaulted by a system or a region set by a user.

Figure 3:
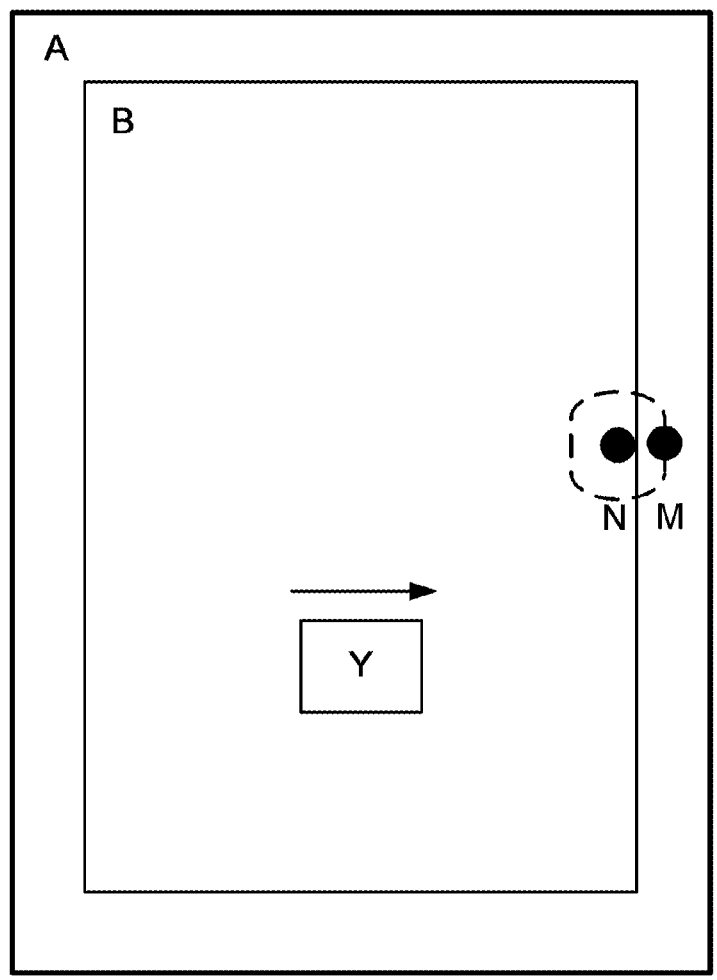
FIG. 3 is a schematic diagram of the method for reporting a coordinate point of the touch screen in the embodiments.

As an example shown in FIG. 3, the range indicated by A is the display range of the touch screen of the mobile terminal, and the range indicated by B is the non-border region of the touch screen. If the user wants to touch the icon at the point M, the coordinates of the touch event cover the range circled by the dotted line in FIG. 3. According to methods of the related art, the coordinate location of the point N will be reported, so that the user cannot touch the icon at the point M successfully. When the method of the present solution is applied, the user uses one finger to touch, the mobile terminal detects that the range of the coordinates of a first touch event covers the range circled by the dotted line in FIG. 3. At the same time, another finger is used to touch the range at the point Y (it may be to touch the range at the point Y fixedly, or to touch movably, such as moving to the right horizontally, in the non-border region of the touch screen). When detecting a second touch event, the mobile terminal determines that two touch events exist simultaneously, the coordinate points of the first touch event include coordinate points belonging to the border region of the touch screen, and all of the coordinate points of the second touch event belong to the non-border region of the touch screen. The coordinate point is corrected from the point N to the point M, and the coordinate difference between the point M and N may be the fixed number of pixels or the number of pixels calculated according to the movement speed of the coordinate point in the second touch event. As a result, the user can touch the icon at the point M successfully.

In the present solution, the second touch is added by employing the multi-touch characteristic of the terminal screen. Based on calculating and reporting the coordinate point with the original method, the coordinate points are corrected so that the corrected coordinate points are more nearer to the target in the border region of the touch screen that the user want to touch. According to the present solution, the problem that the target in the border of the touch screen cannot be touched successfully can be solved without increasing the hardware overhead.

It's important to note that the embodiments and the features of the embodiments in the present application may be combined with each other and arbitrarily without confliction.

Of course, present document may have other various embodiments. Those skilled in the art can make various corresponding changes and transformations according to the embodiments of the present document, however, all the corresponding changes and transformations shall fall within the scope protected by the appended claims of the present document.

It should be understood by those skilled in the art that the whole or part of the steps in the above method can be completed by a program instructing relevant hardwires, the program may be stored in computer readable storage medium, such as readable memory, magnet disk or optical disk. Alternatively, the whole or part of the steps of the above embodiments can be implemented by one or more integrated circuits. Accordingly, the respective module/unit in the above embodiments can be implemented by using hardware or software function module. In this way, the present document is not limited to any particular combination of hardware and software.

INDUSTRIAL APPLICABILITY

In the present solution, the second touch is added by employing the multi-touch characteristic of the terminal screen. Based on calculating and reporting the coordinate point with the original method, the coordinate points are corrected so that the corrected coordinate points are more nearer to the target in the border region of the touch screen that the user want to touch. According to the present solution, the problem that the target in the border of the touch screen cannot be touched successfully can be solved without increasing the hardware overhead.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for reporting a coordinate point of a touch screen, comprising:
    a mobile terminal receiving a touch event of the touch screen; and
    when two touch events are received simultaneously with coordinate points of one of the two touch events which is called as a first touching event including coordinate points belonging to a border region of the touch screen and all of the coordinate points of the other one of the two touch events which is called as a second touch event belonging to a non-border region of the touch screen, the mobile terminal calculating a central coordinate point of the first touch event, according to the second touch event, correcting the central coordinate point so as to move the central coordinate towards a border side of the touch screen nearest to the central coordinate point, and taking the corrected coordinate point as a reported coordinate point.

2. The method according to claim 1, further comprising:
    when only one touch event is received and the coordinate points of the touch event do not include coordinate points belonging to the border region of the touch screen, the mobile terminal taking the central coordinate point of the touch event as the reported coordinate point.

3. The method according to claim 1, wherein,
    the step of the mobile terminal correcting the central coordinate point to a border side of the touch screen nearest to the central coordinate point according to the second touch event comprises:
    correcting a fixed number of pixels, or correcting a number of pixels determined according to a movement speed of the coordinate point of the second touch event.

4. The method according to claim 1, wherein,
    correcting the central coordinate point is in a direction which is perpendicular to the border side of the touch screen nearest to the central coordinate point, or in a direction which is same with a movement direction of the coordinate point of the second touch event.

5. The method according to claim 1, wherein,
    the border region of the touch screen is a preset region defaulted by a system or a region set by a user.

6. A mobile terminal for reporting a coordinate point of a touch screen, comprising hardware performing instructions stored in a non-transitory computer readable medium which executes steps in following modules:
- a touch perception module and a coordinate point generation module, wherein:
- the touch perception module is configured to: send a touch event of the touch screen perceived to the coordinate point generation module;
- the coordinate point generation module comprises: a reception unit and a coordinate point generation unit;
- the reception unit is configured to: receive the touch event and send the touch event to the coordinate point generation unit;
- the coordinate point generation unit is configured to: take a central coordinate point of the touch event as a reported coordinate point;
- the coordinate point generation module further comprises: a judgment unit and a corrected coordinate point generation unit;
- the reception unit is configured to: send the touch event received to the judgment unit;
- the judgment unit is configured to: when two touch events are received simultaneously with coordinate points of one of the two touch events which is called as a first touching event including coordinate points belonging to a border region of the touch screen and all of the coordinate points of the other one of the two touch events which is called as a second touch event belonging to a non-border region of the touch screen, send the first touch event and the second touch event to the corrected coordinate point generation unit;
- the corrected coordinate point generation unit is configured to: calculate the central coordinate point of the first touch event, according to the second touch event, correct the central coordinate point so as to move the central coordinate towards a border side of the touch screen nearest to the central coordinate point, and take the corrected coordinate point as the reported coordinate point.

7. The mobile terminal according to claim 6, wherein,
the judgment unit is further configured to: when only one touch event is received and coordinate points of the touch event do not include coordinate points belonging to the border region of the touch screen, send the touch event to the coordinate point generation unit.

8. The mobile terminal according to claim 6, wherein,
the corrected coordinate point generation unit is configured to: correct a fixed number of pixels, or correct a number of pixels determined according to a movement speed of the coordinate point of the second touch event.

9. The mobile terminal according to claim 6, wherein,
the corrected coordinate point generation unit is configured to: perform the correction in a direction which is perpendicular to the border side of the touch screen nearest to the central coordinate point, or in a direction which is same with a movement direction of the coordinate point of the second touch event.

10. The mobile terminal according to claim 6, wherein,
the coordinate point generation module further comprises a touch screen border region setting unit;
the touch screen border region setting unit is configured to: take a preset region defaulted by a system or a region set by a user as the border region of the touch screen to output to the judgment unit.

* * * * *